United States Patent
Lomprey et al.

(10) Patent No.: US 6,496,294 B2
(45) Date of Patent: *Dec. 17, 2002

(54) ANODIC ELECTROACTIVE MATERIALS HAVING A SOLUBLIZING MOIETY

(75) Inventors: Jeffrey R. Lomprey, Holland, MI (US); Thomas F. Guarr, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/907,047

(22) Filed: Jul. 17, 2001

(65) Prior Publication Data

US 2002/0008897 A1 Jan. 24, 2002

Related U.S. Application Data

(63) Continuation of application No. 09/454,043, filed on Dec. 3, 1999, now Pat. No. 6,262,832.

(51) Int. Cl.[7] .......................... G02F 1/15; G02F 11/53; F21V 9/00

(52) U.S. Cl. ...................... 359/265; 359/267; 359/270; 359/273; 252/582

(58) Field of Search ................. 359/265, 267, 359/270, 273; 252/582

(56) References Cited

U.S. PATENT DOCUMENTS

| | | | |
|---|---|---|---|
| 4,402,573 A | 9/1983 | Jones | |
| 4,902,108 A | 2/1990 | Byker | |
| 5,724,187 A | 3/1998 | Varaprasad et al. | |
| 5,910,854 A | 6/1999 | Varaprasad et al. | |
| 5,998,617 A | 12/1999 | Srinivasa et al. | |
| 6,002,511 A | * 12/1999 | Varaprasad et al. | 359/265 |
| 6,183,878 B1 | 2/2001 | Berneth et al. | |
| 6,193,912 B1 | 2/2001 | Theiste et al. | |
| 6,241,916 B1 | 6/2001 | Claussen et al. | |
| 6,262,832 B1 | * 7/2001 | Lomprey | 359/265 |
| 6,277,307 B1 | 8/2001 | Berneth et al. | |
| 6,301,038 B1 | 10/2001 | Fitzmaurice et al. | |

FOREIGN PATENT DOCUMENTS

SU 830456 A1 2/1993

* cited by examiner

*Primary Examiner*—Hung Xuan Dang
*Assistant Examiner*—Tuyen Tra
(74) *Attorney, Agent, or Firm*—King & Javanovic, PLC

(57) ABSTRACT

Anodic electrochromic materials for use in an electrochromic device comprising a first moiety, wherein the first moiety comprises a metallocene or a substituted metallocene, and a second moiety, wherein the second moiety comprises at least one constituent which serves to increase the solubility of the first moiety in an associated solvent relative to solubility of the first moiety without the second moiety.

20 Claims, 1 Drawing Sheet

ANODIC ELECTROACTIVE MATERIALS HAVING A SOLUBLIZING MOIETY

CROSS-REFERENCE TO RELATED APPLICATION(S)

This application is a continuation application of U.S. application Ser. No. 09/454,043 filed on Dec. 31, 1999 now U.S. Pat. No. 6,262,832, the entirety of which is hereby incorporated herein by reference.

BACKGROUND OF THE INVENTION

1. Field of the Invention

The present invention relates in general to electrochromic materials for use in electrochromic devices, and more particularly, to anodic electrochromic materials comprising a first moiety, such as a metallocene or a substituted metallocene, and a second moiety having one or more constituent(s) which serve to increase the solubility of the first moiety in an associated solvent relative to the solubility of the first moiety without the second moiety.

2. Background Art

Electrochromic devices have been known in the art for several years. Furthermore, experimentation associated with the utilization of metallocenes and simple substituted metallocenes as anodic electrochromic materials has also been explored. While the utilization of such anodic electrochromic materials in devices such as electrochromic mirrors and windows has been identified, the solubility characteristics of many of these anodic electrochromic materials remains problematic.

It is therefore an object of the present invention to provide an anodic electrochromic material with a solublizing moiety that remedies the aforementioned detriments and/or complications associated with the incorporation of the above-identified anodic electrochromic materials into a solvent at an operatively acceptable concentration.

SUMMARY OF THE INVENTION

The present invention is directed to an electrochromic medium for use in an electrochromic device comprising: (a) at least one solvent; (b) a cathodic electrochromic material; and (c) an anodic electrochromic material which includes (1) a first moiety, wherein the first moiety comprises a metallocene or a substituted metallocene, and (2) a second moiety, wherein the second moiety comprises at least one constituent which serves to increase solubility of the first moiety in the at least one solvent relative to the first moiety without the second moiety.

In another aspect of the invention, an electrochromic device is disclosed as comprising: (a) at least one substantially transparent substrate; and (b) an electrochromic medium which comprises (1) at least one solvent, (2) a cathodic electrochromic material, and (3) an anodic electrochromic material which includes a first moiety, wherein the first moiety comprises a metallocene or a substituted metallocene, and a second moiety, wherein the second moiety comprises at least one constituent which serves to increase solubility of the first moiety in the at least one solvent relative to the first moiety without the second moiety.

In a preferred embodiment of the invention, the first moiety is selected from the group comprising ferrocene, substituted ferrocenes, and mixtures thereof, and the second moiety is selected from the group comprising nitriles, nitro constituents, sulfoxides, sulfonates, phosphonium constituents, phosphonates, phosphonites, ammonium constituents, viologens including bipyridinyl constituents, carbonyls including carbonates, carbamates, ketones, esters, and amides, ethers including polyethers, amines including tertiary amines, alkenes, alkynes, and mixtures thereof.

The present invention is also directed to an anodic electrochromic material for use in an electrochromic device comprising: (a) a first moiety, wherein the first moiety comprises a metallocene or a substituted metallocene; and (b) a second moiety, wherein the second moiety comprises at least one constituent which serves to increase solubility of the first moiety in an associated solvent relative to the first moiety without the second moiety, and wherein the second moiety is selected from the group comprising nitrites, nitro constituents, sulfoxides, sulfonates, phosphonium constituents, phosphonates, phosphonites, polyethers, viologens including bipyridinyl constituents, carbonyls including carbonates, carbamates, ketones, cyclic esters, and amides, and mixtures thereof.

BRIEF DESCRIPTION OF THE DRAWINGS

The invention will now be described with reference to the drawings wherein.

DETAILED DESCRIPTION OF THE INVENTION

Figure 1:
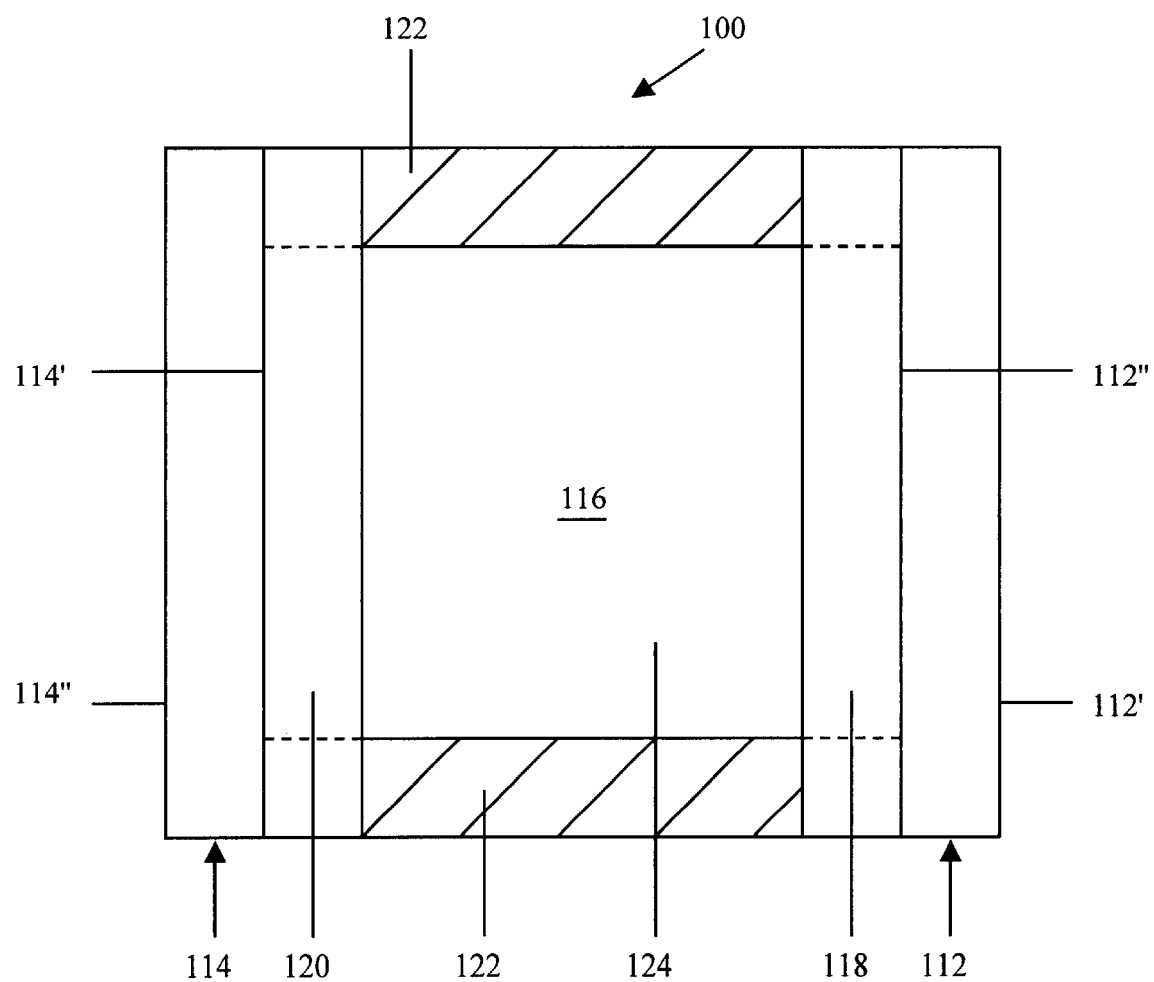
FIG. 1 of the drawings is a cross-sectional schematic representation of an electrochromic device fabricated in accordance with the present invention.

Referring now to the drawings and to FIG. 1 in particular, a cross-sectional schematic representation of electrochromic device 100 is shown, which generally comprises first substrate 112 having a front surface 112' and a rear surface 112", second substrate 114 having a front surface 114' and a rear surface 114", and chamber 116 for containing electrochromic medium 124. It will be understood that electrochromic device 100 may comprise, for illustrative purposes only, a mirror, a window, a display device, a contrast enhancement filter, and the like. It will be further understood that FIG. 1 is merely a schematic representation of electrochromic device 100. As such, some of the components have been distorted from their actual scale for pictorial clarity. Indeed, numerous other electrochromic device configurations are contemplated for use, including those disclosed in U.S. Pat. No. 5,818,625 entitled "Electrochromic Rearview Mirror Incorporating A Third Surface Metal Reflector," (hereinafter the '625 patent) which is hereby incorporated herein by reference in its entirety.

First substrate 112 may be fabricated from any one of a number of materials that are transparent or substantially transparent in the visible region of the electromagnetic spectrum, such as, for example, borosilicate glass, soda lime glass, float glass, natural and synthetic polymeric resins or plastics including Topas,® which is commercially available from Ticona of Summit, N.J. First substrate 112 is preferably fabricated from a sheet of glass having a thickness ranging from approximately 0.5 millimeters (mm) to approximately 12.7 mm. Of course, the thickness of the substrate will depend largely upon the particular application of the electrochromic device. While particular substrate materials have been disclosed, for illustrative purposes only, it will be understood that numerous other substrate materials are likewise contemplated for use—so long as the materials are at least substantially transparent and exhibit appropriate physical properties which will enable them to operate effectively in conditions of intended use. Indeed, electrochromic devices in accordance with the present invention can be, during normal operation, exposed to extreme temperatures as well as exposed to substantial ultraviolet radiation, emanating primarily from the sun.

Second substrate 114 can be fabricated from similar materials as that of first substrate 112. However, if the electrochromic device is a mirror, then the requisite of substantial transparency is not necessary. As such, second substrate 114 may, alternatively, comprise polymers, metals, glass, ceramics, or other similar materials. Second substrate 114 is preferably fabricated from a sheet of glass having a thickness ranging from approximately 0.5 mm to approximately 12.7 mm. If first and second substrates 112 and 114, respectively, are fabricated from sheets of glass, then the glass can optionally be tempered or strengthened by thermal or chemical means prior to or subsequent to being coated with layers of electrically conductive material (118 and 120).

One or more layers of electrically conductive material 118 are associated with rear surface 112" of the first substrate. These layers serve as an electrode for the electrochromic device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the electrochromic device or the atmosphere; and (e) exhibits minimal diffusion or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium doped tin oxide (ITO), doped zinc oxide or other materials known in the art.

Electrically conductive material 120 is preferably associated with front surface 114' of second substrate 114, and is operatively bonded to electrically conductive material 118 by sealing member 122. As can be seen in FIG. 1, once bonded, sealing member 122 and the juxtaposed portions of electrically conductive materials 118 and 120 serve to define the inner peripheral geometry of chamber 116.

Electrically conductive material 120 may vary depending upon the intended use of the electrochromic device. For example, if the electrochromic device is a mirror, then the material may comprise a transparent conductive coating similar to electrically conductive material 118 (in which case a reflector is associated with rear surface 114" of second substrate 114). Alternatively, electrically conductive material 120 may comprise a layer of reflective material in accordance with the teachings of the above-referenced '625 patent. In this case, electrically conductive material 120 is associated with front surface 114' of second substrate 114. Typical coatings for this type of reflector include chrome, rhodium, silver, silver alloys, and combinations thereof.

Sealing member 122 may comprise any material that is capable of being adhesively bonded to the electrically conductive materials 118 and 120 to, in turn, seal chamber 116 so that electrochromic medium 124 does not inadvertently leak out of the chamber. As is shown in dashed lines in FIG. 1, it is also contemplated that the sealing member extend all the way to rear surface 112" and front surface 114' of their respective substrates. In such an embodiment, the layers of electrically conductive material 118 and 120 may be partially removed where the sealing member 122 is positioned. If electrically conductive materials 118 and 120 are not associated with their respective substrates, then sealing member 122 preferably bonds well to glass. It will be understood that sealing member 122 can be fabricated from any one of a number of materials including, for example, those disclosed in U.S. Pat. Nos. 4,297,401, 4,418,102, 4,695,490, 5,596,023, 5,596,024, 4,297,401, and U.S. patent application Ser. No. 09/158,423 entitled "Improved Seal For Electrochromic Devices," all of which are herein incorporated by reference.

Electrochromic medium 124 is shown in FIG. 1, which generally comprises an anodic electrochromic material, a cathodic electrochromic material, and one or more solvents. The term "electrochromic" will be defined herein, regardless of its ordinary meaning, as a material that has a change in its extinction coefficient at one or more wavelengths upon exposure to a particular electrical potential difference. While the cathodic material has been disclosed as being "electrochromic," it is likewise contemplated that the cathodic material can be merely "electroactive." The term "electroactive" will be defined herein, regardless of its ordinary meaning, as a material that undergoes a modification in its oxidation state upon exposure to a particular electrical potential difference.

For purposes of the present disclosure, the electrochromic medium disclosed herein below may comprise any one of a number of media types including solution phase and gelled media as disclosed in U.S. Pat. No. 5,928,572 entitled "Electrochromic Layer and Devices Comprising Same," which is incorporated herein by reference. It will be further understood that the electrochromic materials disclosed in the present invention may also be "tied" into a gelatinous media in accordance with the teachings of U.S. Pat. No. 5,910,854 entitled "Electrochromic Polymeric Solid Films, Manufacturing Electrochromic Devices Using Such Solid Films, And Processes For Making Such Solid Films and Devices," which is incorporated herein by reference. In addition, a hybrid medium is likewise contemplated for use. In a hybrid medium, the cathodic material can be applied (in a solid form) to its respective electrically conductive material. For example, tungsten oxide ($WO_3$) can be applied onto the surface of a conventional electrically conductive material.

Cathodic electrochromic materials may include, for example, bipyridinyl based viologens, such as methylviologen tetrafluoroborate or octylviologen tetrafluoroborate. It will be understood that the preparation of the above-identified viologens is well known in the art. While specific cathodic materials have been provided, for illustrative purposes only, numerous other conventional cathodic materials are likewise contemplated for use including, but by no means limited to, those disclosed in U.S. Pat. No. 4,902,108, which is hereby incorporated in its entirety herein by reference. Indeed, the only contemplated limitation relative to the cathodic material is that it should not adversely affect the electrochromic performance of device 100. Moreover, it is contemplated that the cathodic material may comprise a solid transition metal oxide, including, but not limited to, tungsten oxide.

The anodic electrochromic materials of the present invention comprise first and second moieties. The first moiety may include, for example, a metallocene or a substituted metallocene, such as ferrocene or a substituted ferrocene. Preferably the first moiety is represented by the following formula:

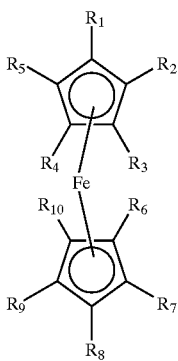

wherein $R_1$–$R_{10}$ are the same or different and comprise H or a straight or branched alkyl group containing approximately 1 to approximately 10 carbon atoms and wherein at least one of $R_1$–$R_{10}$ is associated with the second moiety. While specific metallocenes have been disclosed, for illustrative purposes only, any one of a number of metallocenes are likewise contemplated for use, so long as the particular metallocene exhibits appropriate "electrochromic" qualities as the term is defined herein. Several of the above-identified metallocenes and substituted metallocenes, or their precursors, are available from common commercial chemical vendors, such as Aldrich Chemical Co., of Milwaukee, Wis.

The second moiety comprises at least one constituent which serves to increase solubility of an above-identified first moiety in an associated solvent relative to the solubility of a first moiety without a second moiety. As will be discussed in greater detail below, such increased solubility is highly desirous, inasmuch as many stable, substituted ferrocenes exhibit poor solubility in common, commercially practical solvents—especially in cold temperatures. For purposes of the present disclosure, the second moiety may comprise nitrites, nitro constituents, sulfoxides, sulfonates, phosphonium constituents, phosphonates, phosphonites, ammonium constituents, viologens including bipyridinyl constituents, carbonyls including carbonates, carbamates, ketones, esters, and amides, ethers including polyethers, amines including tertiary amines, alkenes, alkynes, and mixtures thereof. For example, the second moiety may be represented by one or more of the following formulae:

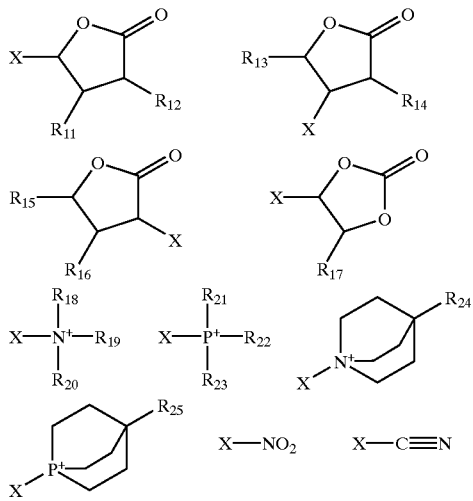

-continued

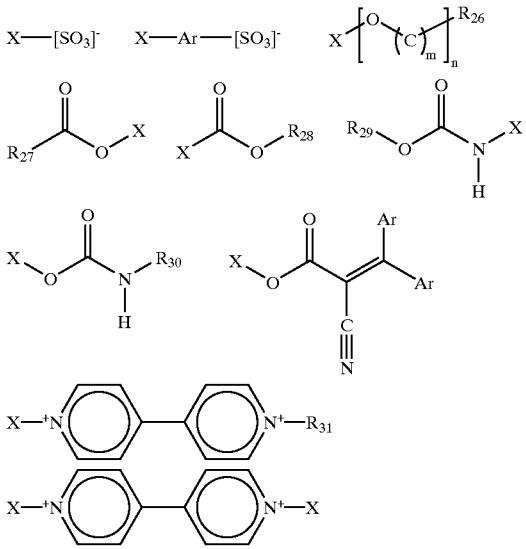

wherein $R_{11}$–$R_{31}$ are the same or different and comprise H or a straight or branched alkyl, aryl, alkaryl, or aralkyl group containing approximately 1 to approximately 10 carbon atoms, wherein Ar is an aryl constituent including phenyl, wherein m is an integer ranging from approximately 1 to approximately 5, wherein n is an integer ranging from approximately 1 to approximately 20, and wherein X is associated with the first moiety and is selected from the group comprising a direct bond, an alkyl, aryl, alkaryl, aralkyl, ether, or polyether chain containing approximately 1 to approximately 40 carbon atoms, a silyl or siloxyl chain containing approximately 1 to approximately 40 silicon atoms, and mixtures thereof Although not shown, it will be understood that many of the second moieties comprise ionic constituents which are associated with balancing counter ions such as cations including group I and II metal cations, transition metal cations, ammonium cations, or other similar cations, or anions including halides, trifluoromethanesulfonate, bis-trifluoromethanesulfonamide, tetrafluoroborate, tetraphenylborate, hexafluorophosphate, or other similar anions.

Alternatively, the second moiety may be represented by the following formula:

$$Y—R_{32}$$

wherein Y is associated with the first moiety and serves to increase solubility of the same, and is selected from the group comprising an aryl, alkaryl, aralkyl, or polyether chain containing approximately 1 to approximately 40 carbon atoms, a silyl or siloxyl chain containing approximately 1 to approximately 40 silicon atoms, and mixtures thereof, and wherein $R_{32}$ comprises H or a straight or branched alkyl, aryl, alkaryl, or aralkyl group containing approximately 1 to approximately 10 carbon atoms.

While preferred second moieties (i.e. solublizing moieties) have been disclosed herein, it will be understood that any one of a number of other second moieties are contemplated for use, including cathodic electrochromic, anodic electrochromic such as phenazines or phenothiazines, UV stabilizing, and "solvent clone" moieties. The term "solvent clone moiety" is defined herein as a moiety that is analogous to the functional constituents of a particular solvent. Indeed, the only contemplated limitation with regard to the second moiety is that it must facilitate material increased solubility of the first moiety in an associated solvent relative to the solubility of the first moiety without the second moiety. It will be understood that the above-identified second moieties comprise common organic constituents, which are available from commercial chemical vendors including Aldrich Chemical Co.

Although not shown, it will be understood that the anodic electrochromic materials of the present invention may comprise numerous mixtures of first and/or second moieties.

For illustrative purposes only, the concentration of the anodic and cathodic electrochromic materials can range from approximately 1 millimolar (mM) to approximately 1000 mM and more preferably from approximately 5 mM to approximately 500 mM. While particular concentrations of the anodic as well as cathodic electrochromic materials have been provided, it will be understood that the desired concentration may vary greatly depending upon the geometric configuration of the chamber containing electrochromic medium 124.

For purposes of the present disclosure, the solvent of the electrochromic medium may comprise one or more of any one of a number of common, commercially available materials including 3-methylsulfolane, glutaronitrile, dimethyl sulfoxide, dimethyl formamide, acetonitrile, polyethers including tetraglyme, alcohols including ethoxyethanol, nitriles including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same. While specific solvents have been disclosed, for illustrative purposes only, as being associated with the electrochromic medium, numerous other solvents that would be known to those having ordinary skill in the art having the present disclosure before them are likewise contemplated for use. Indeed, it will be understood that non-liquid or polymer type electrochromic media are suitable for use in accordance with the present invention.

In addition, the electrochromic medium may also comprise other materials, such as light absorbers, light stabilizers, thermal stabilizers, antioxidants, viscosity modifiers including thickeners, and/or tint providing agents, and mixtures thereof. Suitable UV-stabilizers may include: the material ethyl-2-cyano-3,3-diphenyl acrylate, sold by BASF of Parsippany, N.Y. under the trademark Uvinul N-35 and by Aceto Corp., of Flushing, N.Y. under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl]propionic acid pentyl ester prepared by Gentex Corporation of Zeeland, Me.; the material 2-hydroxy-4-methoxybezophenone sold by American Cyanamid under the trademark Cyasorb UV 9; and the material 2-ethyl-2'-ethoxyalanilide sold by Sandoz Color & Chemicals under the trademark Sanduvor VSU—to name a few. Thickeners include polymethylmethacrylate (PMMA) and polycarbonate both of which are commercially available from, among other chemical suppliers, Aldrich Chemical Co.

Electrochromic devices having as a component part an above-identified anodic electrochromic material can be used in a wide variety of applications wherein, under normal operation, the transmitted or reflected light can be modulated—the skill of which is well known in the art. Such devices include rear-view mirrors for vehicles; windows for the exterior of a building, home or vehicle; skylights for buildings including tubular light filters; windows in office or room partitions; display devices; contrast enhancement filters for displays; light filters for photographic devices and light sensors; and indicators for power cells as well as primary and secondary electrochemical cells.

The electrochromic media of the present invention utilize many different anodic electrochromic materials. The preparation and/or commercially available sources are provided herein, unless the material is well known in the art. It will be understood that, unless specified otherwise, the starting reagents are commercially available from Aldrich Chemical Co., Milwaukee, Wis. and other common chemical suppliers. It will be further understood that conventional chemical abbreviations will be used when appropriate including the following: grams (g); milliliters (ml); moles (mol); millimoles (mmol); molar (M); millimolar (mM); pounds per square inch (psi); and hours (h).

In support of the present invention, several experiments were conducted wherein the solubility characteristics of anodic electrochromic materials comprising first and second moieties, as disclosed herein, were compared to anodic electrochromic materials having analogous first moieties without a solubility increasing, second moiety. The following table provides the anodic electrochromic materials utilized in the experiments below:

| Anodic Electrochromic Material | Preparation/Commercial Source |
|---|---|
| Ferrocene | Aldrich |
| Ferrocenepropylmethylviologen [$BF_4$]$_2$ | Provided herein below |
| Bis-ferrocenehexylviologen [$BF_4$]$_2$ | Provided herein below |
| Ferrocenepropyl-p-cyanophenyl-viologen [$BF_4$]$_2$ | Provided herein below |
| Tetra-t-butylferrocene | T. Leigh, J. Am. Chem. Soc. 1964, 3294–3302 (hereinafter "Leigh") |
| 1-Bromo-6-(tetra-t-butylferrocenyl)-hexane | U.S. application Ser. No. 09/377,455 entitled "Color-Stabilized Electrochromic Devices" (hereinafter the '455 application |
| 1-Triethylammonium-6-(tetra-t-butylferrocenyl)hexane $BF_4$ | '455 application |
| 1-Triethylammonium-3-(tetra-t-butylferrocenyl)propane $BF_4$ | '455 application |
| Tetra-t-butylferrocinium $BF_4$ | '455 application * |
| Tetra-t-butylferrocenehexylmethyl-viologen [$PF_6$]$_2$ | Provided herein below |
| Tetra-t-butylferrocenepropyl-methylviologen [$BF_4$]$_2$ | Provided herein below |
| Octamethylferrocene | Provided herein below |
| Di(triethylammoniumhexyl)octa-methylferrocene [$BF_4$]$_2$ | '455 Application ** |
| Di(methylpentanoate)octamethyl-ferrocene | Provided herein below |

* This material was prepared in an analogous manner to di-t-butyl-diethylferrocinium $BF_4$, except that tetra-t-butylferrocene was used instead of di-t-butyl-diethylferrocene.
** This material was prepared in an analogous manner to 1-triethylammonium-6-(tetra-t-butylferrocenyl)-hexane $BF_4$, except that two equivalents of the ammonium species were associated with octamethylferrocene instead of tetra-t-butylferrocenylhexane.

Synthesis of Ferrocenepropylmethylviologen tetrafluoroborate 6.32 g (20 mmol) of N-methyl-4,4'-dipyridyl hexafluorophosphate was dissolved in 100 ml of acetonitrile whereupon 9.21 g (30 mmol) of 3-bromo-1-ferrocenylpropane was added before heating the mixture to reflux overnight. The 3-bromo-1-ferrocenylpropane was prepared in a similar manner to 6-bromo-1-(tetra-t-butyl)ferrocenylhexane as is disclosed in the '455 application using appropriate derivative starting reagents. The solution refluxed for approximately 40 hours after which a yellow solid was collected on a frit in air. The solution was returned to the heat overnight and more yellow material was collected. A total of 4.41 g (35%) was collected and dried by washing with diethyl ether (Et$_2$O) and drying in air. This solid (3.0 g, 4.81 mmol) was dissolved in water and a filtered, aqueous solution of NaBF$_4$ (8.77 g before dissolution) was added to give a red-clay colored precipitate. The material was collected, redissolved in acetone and another filtered, aqueous solution of NaBF$_4$ (5.0 g) was added. The acetone was slowly removed via rotary evaporation until precipitation began, at which point the mixture was heated to dissolution and then slowly cooled for crystallization. The solid was collected in air on a glass frit and washed with Et$_2$O to give 2.29 g (83%) of ferrocenepropylmethylviologen tetrafluoroborate.

Synthesis of Bis-ferrocenehexylviologen tetrafluoroborate

Bis-ferrocenehexylviologen tetrafluoroborate was prepared in a manner similar to ferrocenepropylmethylviologen tetrafluoroborate using 17.26 g (49.4 mmol) of 6-bromo-1-ferrocenylhexane and 2.5 g (16.0 mmol) of 4,4'-dypyridine to yield 7.71 g (56%) of bis-ferrocenehexylviologen tetrafluoroborate. The 6-bromo-1-ferrocenylhexane was prepared in a similar manner to 6-bromo-1-(tetra-t-butyl) ferrocenylhexane as is disclosed in the '455 application using appropriate derivative starting reagents.

Synthesis of Ferrocenepropyl-p-cyanophenylviologen tetrafluoroborate

Ferrocenepropyl-p-cyanophenylviologen tetrafluoroborate was prepared analogously to ferrocenepropylmethylviologen tetrafluoroborate using 10.71 g (34.9 mmol) of 3-bromo-1-ferrocenylpropane, 4.01 g (11.6 mmol) of N-p-cyanophenyl-4,4'-dipyridyl tetrafluoroborate (see synthesis below) to give 1.87 g (24%) of ferrocenepropyl-p-cyanophenylviologen tetrafluoroborate as a brown, crystalline solid.

Synthesis of N-p-cyanophenyl-4,4'-dipyridyl tetrafluoroborate 85.9 g (550 mmol) of 4,4'-dipyridyl and 112.2 g (553.9 mmol) of 1-chloro-2,4-dinitrobenzene were dissolved in 500 ml of acetonitrile whereupon the solution was stirred at room temperature for approximately 48 h. The solid was collected on a frit in air, washed with acetonitrile, and dried in vacuo to give 73.2 g (37%) of N-2,4-dinitriophenyl-4,4'-dipyridylchloride. 40.0 g (11.5 mmol) of the dinitro complex and 39.52 g (334.5 mmol) of p-cyanoaniline were dissolved in a mixture of 200 ml of dimethylformamide and 375 ml of water under a nitrogen purge, and the solution was heated at reflux overnight. The solution was cooled, the volume reduced to 200 mL, and 800 ml of acetone was added to precipitate the N-p-cyanophenyl-4,4'-dipyridyl chloride as a tan solid. Further recovery of material from the supernatant liquid was facilitated by solvent volume reduction under reduced pressure. The material was dissolved in a minimal amount of water and acetone was again added to precipitate the material as a white solid. 10 g of NaBF$_4$ was dissolved in approximately 100 ml of water whereupon the solution was filtered. The white solid was dissolved in minimal water, the BF$_4^-$ solution added and the resultant white solid was collected by filtration and dried in vacuo to give 13.44 g (35%) of N-p-cyanophenyl-4,4'-dipyridyl tetrafluoroborate as a white solid.

Synthesis of Tetra-t-butyl-ferrocenehexylmethylviologen hexafluorophosphate

Tetra-t-butyl-ferrocenehexylmethylviologen hexafluorophosphate was prepared in a manner similar to ferrocenepropylmethylviologen tetrafluoroborate, 5.26 g (9.2 mmol) of 6-bromo-1-tetra-t-butylferrocenylhexane, 1.45 g (4.59 mmol) of N-methyl-4,4'-dipyridyl hexafluorophosphate, and 2.00 g of potassium hexafluorophosphate which served as the anion exchange material to give 0.82 g (19%) of tetra-t-butyl-ferrocenehexylmethylviologen hexafluorophosphate as a greenish solid.

Synthesis of Tetra-t-butyl-ferrocenepropylmethylviologen tetrafluoroborate 10.19 g (19.17 mmol) of 3-bromo-1-tetra-t-butylferrocenylpropane, 12.5 g (80 mmol) of 4,4'-dipyridine was dissolved in 100 ml of acetonitrile and heated to reflux for 2 days. The 3-bromo-1-tetra-t-butylferrocenylpropane was prepared in an analogous manner to 6-bromo-1-(tetra-t-butyl)ferrocenylhexane as is disclosed in the '455 application using appropriate derivative starting reagents. After cooling, the solvent was removed by rotary evaporation, Et$_2$O was added, and the mixture was filtered to give 4.56 g (35%) of a brown solid. 4.0 g (5.82 mmol) of the brown solid was suspended in 50 ml of acetonitrile, whereupon 1.24 ml (20 mmol) of MeI was added before heating to reflux for approximately 5 h. The solution was cooled to room temperature and the precipitate was collected on a glass frit in air. The solid was washed with Et$_2$O and dried on the frit. The precipitate was dissolved in 1:1 methanol (MeOH):water (H$_2$O) and a filtered, aqueous solution of NaBF$_4$ (10 g) was added with stirring to give a gold colored precipitate which was again collected on a glass frit in air. The solid was redissolved in acetone, another filtered, aqueous solution of NaBF$_4$ (10 g) was added, and the acetone slowly removed by rotary evaporation until precipitation began. The suspension was then heated to dissolution and the solution slowly cooled for crystallization. The solid was collected, washed with Et$_2$O and dried in air to give 2.45 g (53%) of tetra-t-butylferrocenepropylmethylviologen tetrafluoroborate as a brownish gold solid.

Synthesis of Octamethylferrocene 25.00 g (204.6 mmol) of 1,2,4,5-tetramethyl-cyclopenta-1,3-diene was charged into a reaction vessel and dissolved in approximately 200 ml of hexane while under positive nitrogen pressure. The solution was cooled with an ice bath to approximately 0 degrees centigrade, whereupon 84 ml (210 mmol) of 2.5M n-butyllithium was charged into the reaction vessel via syringe. Next, the reaction mixture was allowed to warm to room temperature while being agitated overnight. In a separate vessel, 1.95 g (35 mmol) of Fe in approximately 100 ml of tetrahydrofuran (THF) was purged with nitrogen and then cooled to 0 degrees centigrade. 11.56 g (70 mmol) of FeCl$_3$ was charged into the Fe/THF mixture in 3 equal portions, whereupon the mixture was heated to reflux for approximately 2 hours under a nitrogen atmosphere. The FeCl$_2$-2THF was then cooled to room temperature, and transferred to the LiMe$_4$Cp suspension via cannula. The complete mixture was heated to reflux for 2 hours. After cooling, the reaction was quenched by the addition of approximately 300 ml of water and a small amount of zinc powder. The reaction mixture was charged into a separatory funnel, whereby the organic layer was isolated and collected. The aqueous layer was extracted with Et$_2$O. Next, the organic layers were combined, washed with a saturated brine solution, dried over MgSO$_4$, and filtered. The solvents were then removed by rotary evaporation to give an orange solid which was washed with MeOH and collected on a vacuum frit. Additional product was recovered by reducing the volume of the MeOH solution and cooling in a freezer overnight. The total yield was approximately 22 g of octamethylferrocene.

Synthesis of Di(methylpentanoate)octamethylferrocene 5.00 g (16.8 mmol) of the above-prepared octamethylferrocene was charged into a reaction vessel and dissolved in approximately 100 ml of dichloroethane ($C_2H_4Cl_2$) while under positive nitrogen pressure. 4.48 ml (32.4 mmol) of methyl-5-chloro-5-oxovalerate and 6.7 g (50 mmol) of $AlCl_3$ were charged into the reaction vessel, whereupon the reaction mixture was agitated for approximately 24 hours. Next, approximately 100 ml of water and approximately 2 g of zinc powder were charged into the reaction vessel. The reaction mixture was then agitated for an additional two hours, whereupon approximately 300 ml of $Et_2O$ was added to the mixture. The organic layer was separated via separatory funnel, subsequently washed with a saturated brine solution, and dried over $MgSO_4$. The solution was decanted from the $MgSO_4$ and the solvent was removed via rotary evaporation yielding an oily solid. The oily solid was washed with and crystallized from hexane. Approximately 5 g of intermediary product was isolated. Next, 3.00 g (5.41 mmol) of the intermediary product was suspended in approximately 100 ml of acetic acid while under nitrogen purge. 0.05 g of platinum catalyst was then charged into the reaction vessel and hydrogen gas was introduced into the vessel at a pressure of approximately 40 psi. After all the reagents were loaded, the reaction vessel was agitated (shaken) for approximately two days, whereupon a further 0.1 g of platinum catalyst was added and the hydrogen pressure reset. Again, agitation was carried for an additional day. Finally, the crude product was isolated using the above-identified conventional organic workup with the exception that final product isolation was obtained using a short path silica gel column. 2.58 g of di(methylpentanoate)octamethylferrocene were obtained.

For purposes of clarifying the structures associated with the above-identified anodic electrochromic materials, and to eliminate any ambiguity associated with the nomenclature of the same, their chemical structures are provided below:

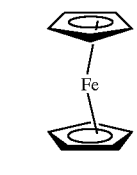

Ferrocene

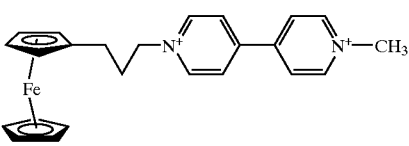

Ferrocenepropylmethylviologen [BF$_4$]$_2$

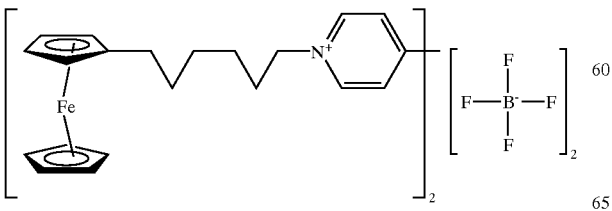

Bis-ferrocenehexylviologen [BF$_4$]$_2$

-continued

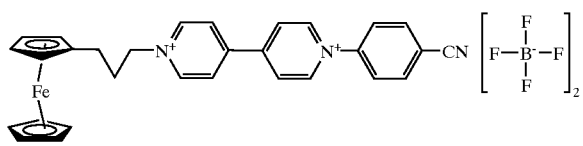

Ferrocenepropyl-p-cyanophenylviologen [BF$_4$]$_2$

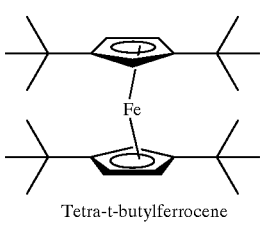

Tetra-t-butylferrocene

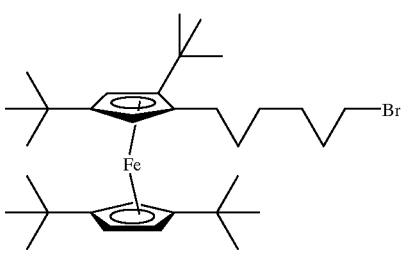

1-Bromo-6-(tetra-t-butylferrocenyl)hexane

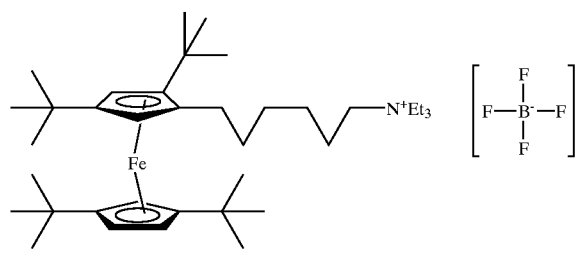

1-Triethylammonium-6-(tetra-t-butylferrocenyl)hexane BF$_4$

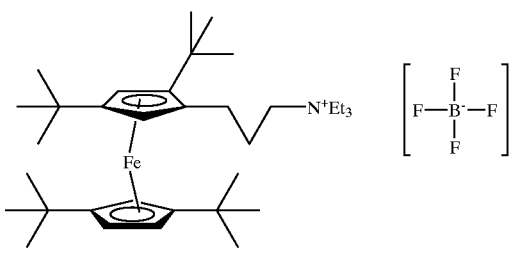

1-Triethylammonium-6-(tetra-t-butylferrocenyl)propane BF$_4$

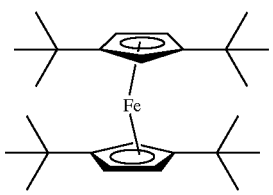

Tetra-t-butylferrocinium BF$_4$

-continued

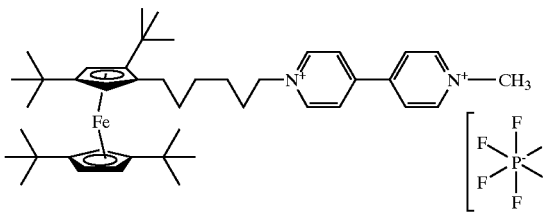

Tetra-t-butyl-ferrocenehexylmethylviologen [PF$_6$]$_2$

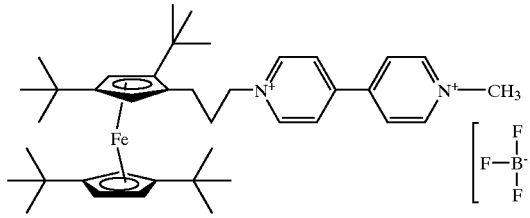

Tetra-t-butyl-ferrocenepropylmethylviologen [BF$_4$]$_2$

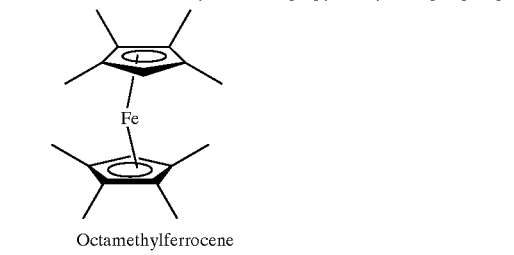

Octamethylferrocene

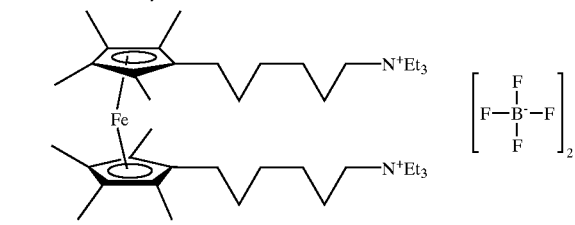

Di(triethylammoniumhexyl)octamethylferrocene

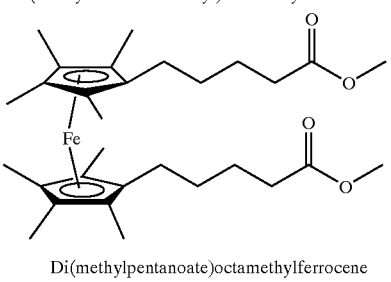

Di(methylpentanoate)octamethylferrocene

In each of the experiments below, the anodic electrochromic materials were dissolved at a known concentration in an appropriate solvent, and their UV-VIS spectrum was recorded, whereupon their absorption coefficients were subsequently determined. (It should be noted that, the absorption coefficients were assumed to be independent of the solvent used). Next, saturated solutions of the same materials were prepared in the solvent of interest, filtered if necessary, diluted if necessary, and their UV-VIS spectra were again recorded. Using the previously determined absorption coefficients, the concentrations at saturation in the solvent of choice were then calculated using conventional analytical techniques. It should be noted that while substantial care was taken during the experiments to ensure analytical precision and accuracy, minor deviations from absolute values may have been realized due to small changes in ambient temperature and/or atmospheric pressure. Nevertheless, inasmuch as the materials prepared in accordance with the present invention exhibited increased solubility by several orders of magnitude, the effect of such minor temperature and/or pressure deviations upon the solubility characteristics of the materials is immaterial.

Experiment No. 1

| Anodic Electrochromic Material | $\lambda$max (nm) | Absorption Coefficient ($\epsilon$) | Solubility in propylene carbonate (mM) |
|---|---|---|---|
| Ferrocene | 440 | 102.9 | 141.5 |
| Ferrocenepropylmethylviologen [BF$_4$]$_2$ | 450 | 148.1 | 319.0 |
| Bis-ferrocenehexylviologen [BF$_4$]$_2$ | 440 | 231.0 | 434.0 |
| Ferrocenepropyl-p-cyanophenyl-viologen [BF$_4$]$_2$ | 419 | 185.0 | 276.0 |

In this experiment, ferrocene comprised the anodic electrochromic material void of a solublizing moiety, and the remainder of the anodic electrochromic materials comprised one or more solublizing moieties. As can be seen from the data collected in this experiment, the anodic electrochromic materials comprising a solublizing, second moiety exhibited increased solubility by more than approximately a factor of two relative to ferrocene.

Experiment No. 2

| Anodic Electrochromic Material | $\lambda$max (nm) | Absorption Coefficient ($\epsilon$) | Solubility in propylene carbonate (mM) | Solubility in $\gamma$-butyrolactone (mM) | Solubility in hexane (mM) |
|---|---|---|---|---|---|
| Tetra-t-butylferrocene | 462 | 160.9 | 0.44 | 1.7 | 277.5 |
| 1-Bromo-6-(tetra-t-butyl ferrocenyl) hexane | 456 | 139.0 | 4.32 | — | — |
| 1-Triethylammonium-6-(tetra-t-butyl-ferrocenyl)-hexane BF$_4$ | 454 | 112.7 | 514.4 | 861.3 | — |
| 1-Triethylammonium-6-(tetra-t-butyl-ferrocenyl)-propane BF$_4$ | 450 | 123.1 | 259.8 | — | — |
| Tetra-t-butyl-ferrocinium BF$_4$ | 682 | 475.8 | >399.0 | — | — |
| Tetra-t-butylferrocene-hexyl-methylviologen [PF$_6$]$_2$ | 703.5 | 90 | 206 | — | — |
| Tetra-t-butylferrocene-propyl-methylviologen [BF$_4$]$_2$ | 454.5 | 168.0 | 276.0 | — | — |

In this experiment the anodic electrochromic material void of a solublizing moiety comprised tetra-t-butylferrocene, and the remainder of the anodic electrochromic materials comprised one or more solublizing moieties. Again, as can be seen from the data collected in this experiment, the anodic electrochromic materials comprising a solublizing, second moiety exhibited increased solubility by more than one order of magnitude relative to tetra-t-butylferrocene.

| Anodic Electrochromic Material | λmax (nm) | Absorption Coefficient (ε) | Solubility in propylene carbonate (mM) | Solubility in γ-butyrolactone (mM) | Solubility in hexane (mM) |
|---|---|---|---|---|---|
| Octamethylferrocene | 426 | 123.0 | 20.32 | — | — |
| Di(triethylammonium-hexyl)-octamethyl-ferrocene [BF₄]₂ | 419 | 128.0 | 619.5 | — | — |
| Di(methylpentanoate)-octamethylferrocene | 420 | 130.8 | 520.5 | — | — |

Experiment No. 3

In this experiment the anodic electrochromic material void of a solublizing moiety comprised octamethylferrocene, and the remainder of the anodic electrochromic materials comprised one or more solublizing moieties. As can be seen from the data collected in this experiment, the anodic electrochromic materials comprising a solublizing, second moiety exhibited increased solubility by more than one order of magnitude relative to octamethylferrocene.

In summary, Experiment Nos. 1–3 verify that, indeed, an anodic electrochromic material that exhibits problematic solubility characteristics can become acceptably soluble in particular solvents upon association with second moieties in accordance with the present invention. Such an increase in solubility can be especially beneficial for electrochromic devices that are routinely exposed to extreme weather conditions inasmuch as cold temperatures can substantially, adversely affect the solubility characteristics of an associated anodic electrochromic material.

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed is:

1. An electrochromic medium for use in an electrochromic device, comprising:
   at least one solvent;
   a cathodic electroactive material;
   an anodic electroactive material which includes;
     a first moiety having a solubility in the at least one solvent; and
     a second moiety, wherein the second moiety comprises at least one constituent which serves to increase the solubility of the first moiety in the at least one solvent relative to the first moiety without the second moiety; and
   wherein at least one of the cathodic and anodic electroactive materials is electrochromic.

2. The electrochromic medium according to claim 1, wherein the second moiety comprises at least one constituent which serves to increase the solubility of the first moiety in the at least one solvent by a factor of greater than approximately two relative to the first moiety without the second moiety.

3. The electrochromic medium according to claim 1, wherein the second moiety comprises at least one constituent which serves to increase the solubility of the first moiety in the at least one solvent by more than approximately one order of magnitude relative to the first moiety without the second moiety.

4. The electrochromic medium according to claim 1, wherein the first moiety is selected from the group comprising ferrocene, substituted ferrocenes, and mixtures thereof.

5. The electrochromic medium according to claim 1, wherein the first moiety is represented by the formula:

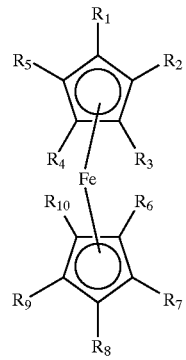

wherein $R_1$–$R_{10}$ are the same or different and comprise H or a straight or branched alkyl group containing approximately 1 to approximately 10 carbon atoms and wherein at least one of $R_1$–$R_{10}$ is associated with the second moiety.

6. The electrochromic medium according to claim 5, wherein $R_1$–$R_{10}$ are the same or different and at least three of $R_1$–$R_{10}$ comprise a straight or branched alkyl group containing approximately 1 to approximately 40 carbon atoms, and wherein any remainder of $R_1$–$R_{10}$ comprise H.

7. The electrochromic medium according to claim 1, wherein the second moiety is selected from the group comprising nitrites, nitro constituents, sulfoxides, sulfonates, phosphonium constituents, phosphonates, phosphonites, ammonium constituents, viologens including bipyridinyl constituents, carbonyls including carbonates, carbamates, ketones, esters, and amides, ethers including polyethers, amines including tertiary amines, alkenes, alkynes, and mixtures thereof.

8. The electrochromic medium according to claim 1, wherein the second moiety is represented by at least one of the formulae:

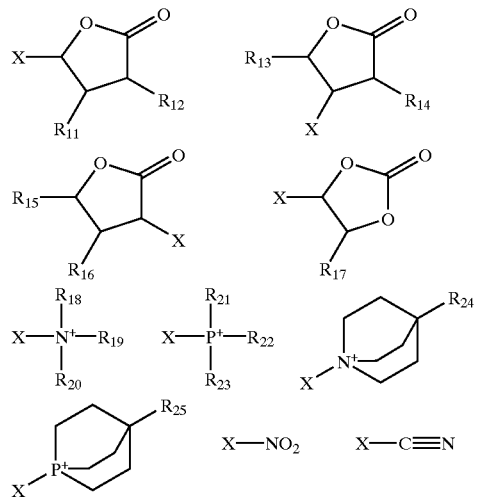

17

-continued

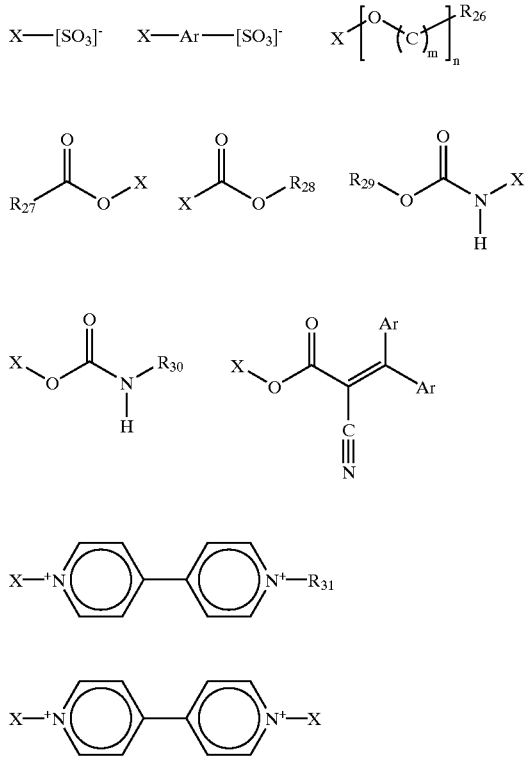

wherein $R_{11}$–$R_{31}$ are the same or different and comprise H or a straight or branched alkyl, aryl, alkaryl, or aralkyl group containing approximately 1 to approximately 10 carbon atoms;

wherein Ar is an aryl constituent including phenyl;

wherein m is an integer ranging from approximately 1 to approximately 5;

wherein n is an integer ranging from approximately 1 to approximately 20; and wherein X is associated with the first moiety and is selected from the group comprising a direct bond, an alkyl, aryl, alkaryl, aralkyl, ether, or polyether chain containing approximately 1 to approximately 40 carbon atoms, a silyl or siloxyl chain containing approximately 1 to approximately 40 silicon atoms, and mixtures thereof.

9. The electrochromic medium according to claim 1, wherein the second moiety is represented by the formula:

wherein Y is associated with the first moiety and serves to increase solubility of the same, and is selected from the group comprising an aryl, alkaryl, aralkyl, or polyether chain containing approximately 1 to approximately 40 carbon atoms, a silyl or siloxyl chain containing approximately 1 to approximately 40 silicon atoms, and mixtures thereof; and wherein $R_{32}$ comprises H or a straight or branched alkyl, aryl, alkaryl, or aralkyl group containing approximately 1 to approximately 10 carbon atoms.

10. The electrochromic medium according to claim 1, wherein the at least one solvent is selected from the group comprising 3-methylsulfolane, glutaronitrile, dimethyl sulfoxide, dimethyl formamide, acetonitrile, polyethers

18 including tetraglyme, alcohols including ethoxyethanol, nitrites including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same.

11. The electrochromic medium according to claim 1, wherein the concentration of the anodic material ranges from approximately 1 mM to approximately 1000 mM.

12. The electrochromic medium according to claim 11, wherein the concentration of the anodic material ranges from approximately 5 mM to approximately 500 mM.

13. An electrochromic medium for use in an electrochromic device, comprising:

at least one solvent, wherein the at least one solvent is selected from the group comprising 3-methylsulfolane, glutaronitrile, dimethyl sulfoxide, dimethyl formamide, acetonitrile, polyethers including tetraglyme, alcohols including ethoxyethanol, nitriles including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same;

a cathodic electroactive material;

an anodic electroactive material which includes;
a first moiety having a solubility in the at least one solvent, wherein the first moiety is selected from the group comprising ferrocene, substituted ferrocenes, and mixtures thereof; and
a second moiety, wherein the second moiety comprises at least one constituent which serves to increase the solubility of the first moiety in the at least one solvent relative to the first moiety without the second moiety, and wherein the second moiety is selected from the group comprising nitriles, nitro constituents, sulfoxides, sulfonates, phosphonium constituents, phosphonates, phosphonites, ammonium constituents, viologens including bipyridinyl constituents, carbonyls including carbonates, carbamates, ketones, esters, and amides, ethers including polyethers, amines including tertiary amines, alkenes, alkynes, and mixtures thereof; and wherein at least one of the cathodic and anodic electroactive materials is electrochromic.

14. An electrochromic medium for use in an electrochromic device, comprising:

at least one solvent, wherein the at least one solvent is selected from the group comprising 3-methylsulfolane, glutaronitrile, dimethyl sulfoxide, dimethyl formamide, acetonitrile, polyethers including tetraglyme, alcohols including ethoxyethanol, nitriles including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same;

a cathodic electroactive material;

an anodic electroactive material which includes;
a first moiety having a solubility in the at least one solvent, wherein the first moiety is represented by the formula:

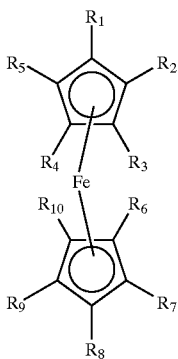

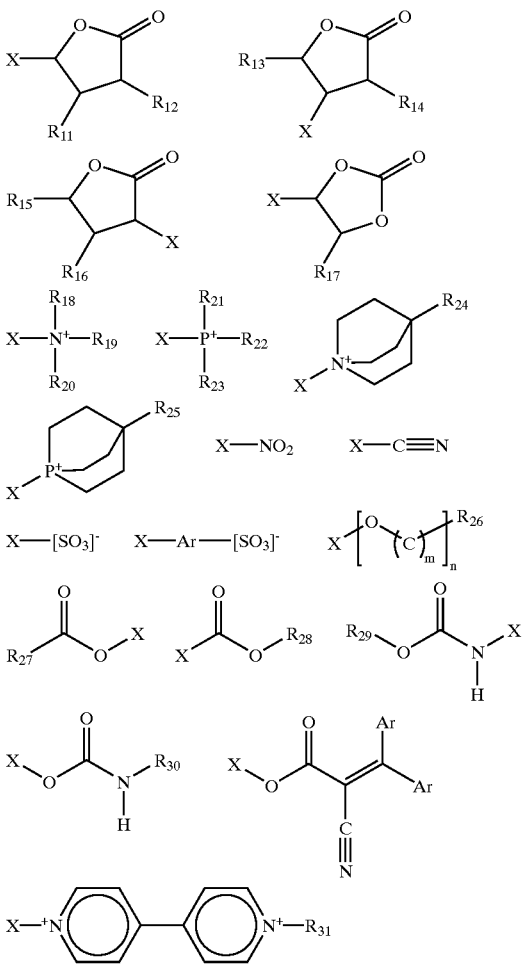

wherein $R_1$–$R_{10}$ are the same or different and comprise H or a straight or branched alkyl group containing approximately 1 to approximately 10 carbon atoms and wherein at least one of $R_1$–$R_{10}$ is associated with the second moiety; and a second moiety, wherein the second moiety comprises at least one constituent which serves to increase the solubility of the first moiety in the at least one solvent relative to the first moiety without the second moiety, and wherein the second moiety is represented by at least one of the formulae:

-continued

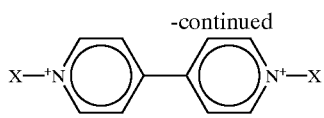

wherein $R_{11}$–$R_{31}$ are the same or different and comprise H or a straight or branched alkyl, aryl, alkaryl, or aralkyl group containing approximately 1 to approximately 10 carbon atoms;

wherein Ar is an aryl constituent including phenyl;

wherein m is an integer ranging from approximately 1 to approximately 5;

wherein n is an integer ranging from approximately 1 to approximately 20; and wherein X is associated with the first moiety and is selected from the group comprising a direct bond, an alkyl, aryl, alkaryl, aralkyl, ether, or polyether chain containing approximately 1 to approximately 40 carbon atoms, a silyl or siloxyl chain containing approximately 1 to approximately 40 silicon atoms, and mixtures thereof; or wherein the second moiety is represented by the formula:

$$Y\text{—}R_{32}$$

wherein Y is associated with the first moiety and serves to increase solubility of the same, and is selected from the group comprising an aryl, alkaryl, aralkyl, or polyether chain containing approximately 1 to approximately 40 carbon atoms, a silyl or siloxyl chain containing approximately 1 to approximately 40 silicon atoms, and mixtures thereof; and wherein $R_{32}$ comprises H or a straight or branched alkyl, aryl, alkaryl, or aralkyl group containing approximately 1 to approximately 10 carbon atoms; and wherein at least one of the cathodic and anodic electroactive materials is electrochromic.

15. An electrochromic device, comprising:

a first substantially transparent substrate having an electrically conductive material associated therewith;

a second substrate having an electrically conductive material associated therewith;

an electrochromic medium contained within a chamber positioned between the first and second substrates which comprises:

at least one solvent;

a cathodic electroactive material;

an anodic electroactive material which includes;

a first moiety having a solubility in the at least one solvent; and a second moiety, wherein the second moiety comprises at least one constituent which serves to increase the solubility of the first moiety in the at least one solvent relative to the first moiety without the second moiety; and wherein at least one of the cathodic and anodic electroactive materials is electrochromic.

16. The electrochromic device according to claim 15, wherein the second moiety comprises at least one constituent which serves to increase the solubility of the first moiety in the at least one solvent by a factor of greater than approximately two relative to the first moiety without the second moiety.

17. The electrochromic device according to claim 15, wherein the second moiety comprises at least one constituent which serves to increase the solubility of the first moiety in the at least one solvent by more than approximately one order of magnitude relative to the first moiety without the second moiety.

18. An anodic electrochromic material for use in an electrochromic device, comprising:
- a first moiety having a solubility in at least one associated solvent; and
- a second moiety, wherein the second moiety comprises at least one constituent which serves to increase the solubility of the first moiety in the at least one solvent relative to the first moiety without the second moiety.

19. The electrochromic medium according to claim 18, wherein the second moiety comprises at least one constituent which serves to increase the solubility of the first moiety in the at least one solvent by a factor of greater than approximately two relative to the first moiety without the second moiety.

20. The electrochromic medium according to claim 18, wherein the second moiety comprises at least one constituent which serves to increase the solubility of the first moiety in the at least one solvent by more than approximately one order of magnitude relative to the first moiety without the second moiety.

* * * * *